United States Patent
Allaire et al.

(10) Patent No.: US 9,934,121 B2
(45) Date of Patent: Apr. 3, 2018

(54) INTENT-BASED INTERACTION WITH CLUSTER RESOURCES

(71) Applicant: Microsoft Technology Licensing, LLC, Redmond, WA (US)

(72) Inventors: Alexandre Joseph Francois Allaire, Seattle, WA (US); Noah Aaron Cedar Davidson, Woodinville, WA (US); Alexander Say Go, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/192,182

(22) Filed: Jun. 24, 2016

(65) Prior Publication Data
US 2017/0371759 A1    Dec. 28, 2017

(51) Int. Cl.
| G06F 9/44 | (2006.01) |
| G06F 11/34 | (2006.01) |
| G06F 9/54 | (2006.01) |
| G06F 11/30 | (2006.01) |

(52) U.S. Cl.
CPC ......... *G06F 11/3409* (2013.01); *G06F 9/543* (2013.01); *G06F 11/3024* (2013.01)

(58) Field of Classification Search
CPC .................................................. G06F 11/3409
See application file for complete search history.

(56) References Cited

U.S. PATENT DOCUMENTS

| 8,412,810 B1 * | 4/2013 | Tompkins ........... G06F 9/45558 |
| | | 709/201 |
| 8,447,894 B2 | 5/2013 | Chen et al. |
| 8,645,300 B1 | 2/2014 | Cowdrey et al. |
| 8,682,736 B2 | 3/2014 | Flake et al. |

(Continued)

OTHER PUBLICATIONS

Pin Nie eta l. "A Cluster-based Data Aggregation Architecture in WSN for Structural Health Monitoring", pp. 546-552, Jul. 1, 2011.*
Brian Xu et al. "Big Data Analytics Framework for System Health Monitoring", pp. 401-408, Jun. 1, 2015.*
Narumoto, et al., "Tuning data aggregation and query performance with Elasticsearch on Azure", Retrieved on: Apr. 22, 2016 Available at: https://azura.microsoft.com/en-us/documentation/articles/guidance-elasticsearch-tuning-data-aggregation-and-query-performance/.

(Continued)

*Primary Examiner* — Andy Ho
*Assistant Examiner* — Abdou Seye
(74) *Attorney, Agent, or Firm* — Michael B. Dodd; Dodd Law Group

(57) ABSTRACT

Aspects extend to methods, systems, and computer program products for intent-based interactions with cluster resources. One or more computer systems are joined in a computer system cluster to provide defined computing functionality (e.g., storage, compute, network, etc.) to an external system. In one aspect, a data collection intent facilitates collection and aggregation of data to form a health report for one or more components of the computer system cluster. In another aspect, a command intent facilitates implementing a command at one or more components of the computer system cluster. Services span machines of the computer system cluster to abstract lower level aspects of data collection and aggregation and command implementation for higher level aspects of data collection and aggregation and command implementation. Services can be integrated into an operating system to relieve users from having to have operating system knowledge.

19 Claims, 9 Drawing Sheets

(56) References Cited

U.S. PATENT DOCUMENTS

| | | | |
|---|---|---|---|
| 9,450,700 B1* | 9/2016 | Van Tonder | H04L 1/0001 |
| 2005/0114501 A1* | 5/2005 | Raden | H04L 43/14 |
| | | | 709/224 |
| 2009/0113034 A1* | 4/2009 | Krishnappa | G06F 15/16 |
| | | | 709/223 |
| 2012/0158925 A1* | 6/2012 | Shen | G06F 11/3476 |
| | | | 709/221 |
| 2014/0040183 A1 | 2/2014 | Kache et al. | |
| 2014/0298091 A1* | 10/2014 | Carlen | H04L 65/80 |
| | | | 714/15 |
| 2014/0310278 A1 | 10/2014 | D'Amato et al. | |
| 2015/0281006 A1 | 10/2015 | Kasturi et al. | |
| 2016/0048408 A1 | 2/2016 | Madhu et al. | |

OTHER PUBLICATIONS

Narumoto, et al., "Running Elasticsearch on Azure", Retrieved on: Apr. 22, 2016 Available at: https://azura.microsoft.com/en-us/documentation/articles/guidance-elasticsearch-running-on-azure/.

"Node", Published on: Mar. 10, 2016 Available at: https://www.elastic.co/guide/en/elasticsearch/reference/current/modules-node.html.

Andhavarapu, Abhishek, "How we optimized 100 sec elasticsearch queries to be under a sub second", Published on: Nov. 24, 2014 Available at: https://abhishek376.wordpress.com/2014/11/24/how-we-optimized-100-sec-elasticsearch-queries-to-be-under-a-sub-second/.

\* cited by examiner

```
struct ServiceControlRequest
{
  string Operation;
  string Service;
  string Originator;
};

//Executed by Server 602          901
{
  ServiceControlRequest r;    ← Command Intent 604
  r.Service = "foo";
  r.Operation = "stop";
  r.Originator = "Server 602";

SendToCommandManager( r );
}

//Executed by Command Manager 623
{
  auto r = ReceiveNewCommand();       902

AddToSharedData( r );           ← Add to Shared Data Layer when ( AllPluginsHaveCompletedCommand( r ) )
  {
    SendCommandComplete( r.Originator );
  }
}

//Executed by Plug-In 624          903
{
  auto r = ReceiveNewSharedData();   ← Access From Shared Data Layer   904 auto serviceHandle = OpenService( r.Service, SC_MANAGER_ALL_ACCESS );   ← Part of API 625 switch ( r.Operation )
  {                                                905
    case "start":
      ControlService( serviceHandle, SERVICE_CONTROL_START );   ← Part of API 625
                                                906
    case "stop":
      ControlService( serviceHandle, SERVICE_CONTROL_STOP );    ← Part of API 625, internally sends
                                                                  Command 661 to Resources 626.
  }

MarkCommandAsComplete( r );
}
```

INTENT-BASED INTERACTION WITH CLUSTER RESOURCES

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. For example, distributed applications can have components at a number of different computer systems.

In some environments, a group of machines (e.g., in a data center) are clustered together to provide a common goal, such as, for example, reliable storage, reliable hosting of virtual machines, etc. To perform the common goal, the individual machines and their resources have to be healthy and interoperating with one another in an intended manner. To verify that the common goal is achieved, an external server can, from time to time, query the health and/or performance of one or more resources allocated to provide the common goal.

For example, a group of machines can allocate resources to provide a storage volume to an external server. To verify that the storage volume is working as intended, the external server can, from time to time, query the health and/or performance of the volume, query the health of each individual machine, query the health of the group of machines, etc. In response to a health query, the relevant resources can return a set of data to the external server. From the data, the external server can infer the health and/or performance of the volume, an individual machine, the group of machines, etc.

In some environments, a director module includes logic for tracking machines and gathering and interpreting data from allocated resources. The director module can receive queries from the external server. The director module determines what resources, from among a group of interoperating resources, are to be checked for health and/or performance in response to a received query. The director module gathers the data from the resources. Based on the included logic, the director module then interprets the data and returns the interpreted data to the external server.

When the director module is resident at one of the machines in a group (e.g., in a cluster), the director module can reach out to other machines in the group (e.g., in the cluster) to obtain data from those other machines. In one aspect, the director module collects data from a number of different machines and also aggregates the data together. The director module then returns the aggregated data to the external server.

BRIEF SUMMARY

Examples extend to methods, systems, and computer program products for intent-based interactions with cluster resources. One or more computer systems are joined in a computer system cluster to provide defined computing functionality (e.g., storage, compute, network, etc.) to an external system. In one aspect, a data collection intent facilitates collection and aggregation of data to form a health report for one or more components of the computer system cluster.

An intent to collect operational data for defined computing functionality is received. The operational data is to indicate the health of the defined computing functionality. Through shared data, the collection intent is persisted to one or more other computer systems of the computer system cluster. Operational data for a computer system is collected in accordance with the persisted collection intent by calling one or more Application Program Interfaces (APIs) at the computer system.

Further collected operational data is received from the one or more other computer systems through point to point messaging. Each of the one or more other computer systems call a further one or more APIs to collect the further collected operational data in accordance with the persisted collection intent. The collected operational data and the further collected operational data is aggregated into a health report responsive to the persisted collection intent. The health report is sent to another device to indicate the health of the defined computing functionality.

In another aspect, a command intent facilitates implementing a command at one or more components of the computer system cluster. A command intent to implement a command for defined computing functionality is received. Through shared data, the command intent is persistent to one or more other computer systems. The command intent is translated to a form compatible with an Application Program Interface (API) capable of implementing the command at the computer system. The API is called with the command intent in the compatible form to instruct the API to implement the command at a computer system. The API may return one or more of: results codes, error codes, and error data for the implemented command.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which:

FIG. 9 illustrates an example pseudo code sample for implementing a command intent.

DETAILED DESCRIPTION

Figure 1:
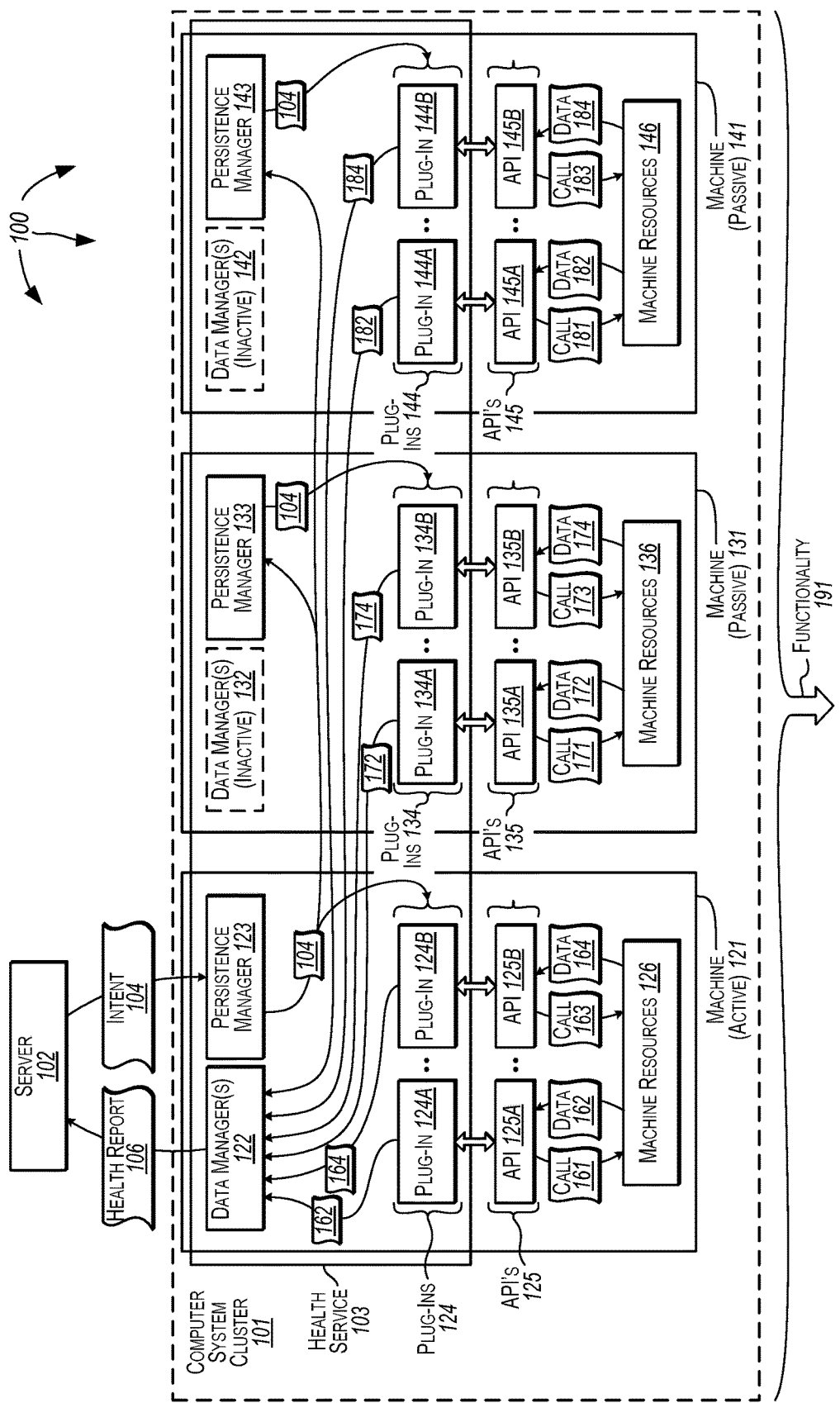
FIG. 1 illustrates an example computer architecture that facilitates collecting and aggregating data for computing functionality provided by a computer system cluster.

Examples extend to methods, systems, and computer program products for intent-based interactions with cluster resources. One or more computer systems are joined in a computer system cluster to provide defined computing functionality (e.g., storage, compute, network, etc.) to an external system. In one aspect, a data collection intent facilitates collection and aggregation of data to form a health report for one or more components of the computer system cluster.

An intent to collect operational data for defined computing functionality is received. The operational data is to indicate the health of the defined computing functionality. Through shared data, the collection intent is persisted to one or more other computer systems of the computer system cluster. Operational data for a computer system is collected in accordance with the persisted collection intent by calling one or more Application Program Interfaces (APIs) at the computer system.

Further collected operational data is received from the one or more other computer systems through point to point messaging. Each of the one or more other computer systems having called a further one or more APIs to collect the further collected operational data in accordance with the persisted collection intent. The collected operational data and the further collected operational data is aggregated into a health report responsive to the persisted collection intent. The health report is sent to another device to indicate the health of the defined computing functionality.

In another aspect, a command intent facilitates implementing a command at one or more components of the computer system cluster. A command intent to implement a command for defined computing functionality is received. Through shared data, the command intent is persistent to one or more other computer systems. The command intent is translated to a form compatible with an Application Program Interface (API) capable of implementing the command at the computer system. The API is called with the command intent in the compatible form to instruct the API to implement the command at a computer system. The API may return one or more of: results codes, error codes, and error data for the implemented command.

Implementations may comprise or utilize a special purpose or general-purpose computer including computer hardware, such as, for example, one or more computer and/or hardware processors (including Central Processing Units (CPUs) and/or Graphical Processing Units (GPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: an intent to collect operational data, operational data, Application Program Interface (API) calls, data returned from API calls, aggregated data, health reports, persisted intent, intent deletions, cluster membership data, cluster membership updates, shared data, point-to-point messages, command intent, commands, results codes, error codes, error data, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, an intent to collect operational data, operational data, Application Program Interface (API) calls, data returned from API calls, aggregated data, health reports, persisted intent, intent deletions, cluster membership data, cluster membership updates, shared data, point-to-point messages, command intent, commands, results codes, error codes, error data, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Thus, aspects of the invention including services, modules, components, etc. can comprise computer hardware, software, firmware, or any combination thereof to perform at least a portion of their functions. For example, a service, module, component, etc. may include computer code configured to be executed in one or more processors and/or in hardware logic/electrical circuitry controlled by the computer code.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

Aspects of the invention include a health service that facilitates intelligent and persistent intent-based data collection and aggregation of operational data from machines in a computer system cluster. The health service spans machines of the computer system cluster (and may be integrated into an operating system used by the machines). The health service also abstracts lower level components used for data collection and aggregation from higher level components used for data collection and aggregation. As such, users are relieved from having to know how to interact with the lower level components.

A data requestor specifies an intent for collection of operational data to the health service. A collection intent can include one or more of: a data type (e.g. perf counter, ETW event, WMI query), a collection strategy (i.e. local node only or all cluster nodes), and aggregation strategy (e.g. summation or average). Supported data types are extensible. The intent persists across machines of the computer system cluster until canceled and is passed on when new machines join the computer system cluster.

The health service automatically performs the collection and aggregation specified in the intent. The resulting final form of the data (e.g., a health report for the computer system cluster or one or more components thereof) is returned back to the requestor. Depending on data type and in accordance with a collection strategy, the data collection can occur from time to time, at specified intervals, on an ongoing basis, for number of collection instances, until explicitly canceled, etc.

FIG. 1 illustrates an example computer architecture 100 that facilitates collecting and aggregating data for computing functionality 191 provided by computer system cluster 101. Referring to FIG. 1, computer architecture 100 includes computer system cluster 101, server 102, and health service 103. Computer system cluster 101 further includes machines 121, 131, and 141 (e.g., computer systems in a data center). Computer system cluster 101, server 102, health service 103, and machines 121, 131, and 141 can be connected to (or be part of) a network, such as, for example, a Local Area Network ("LAN"), a Wide Area Network ("WAN"), and even the Internet. Accordingly, Computer system cluster 101, server 102, health service 103, and machines 121, 131, and 141 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, components of computer system cluster 101 can be allocated to provide functionality 191, such as, for example, a storage volume, virtual machine (VM) hosting, etc., to an external system.

As depicted, health service 103 spans the machines of computer system cluster 101, including machines 121, 131, and 141. Health service 103 provides an intent persistence mechanism. The intent persistent mechanism can persist a data collection intent across machines of computer system cluster 101, including machines 121, 131, and 141.

Health service 103 also provides a data collection mechanism. The data collection mechanism can collect data across the machines of computer system cluster 101, including machines 121, 131, and 141, in accordance with the persisted intent (e.g., data type and collection strategy). Health service 103 also provides a membership tracking mechanism. The membership tracking mechanisms can track membership in computer system cluster 101. For example, the membership tracking mechanism can track when a machine joins computer system cluster 101 and when a machine leaves computer system cluster 101.

In some aspects, different mechanisms of health server 103 interoperate to facilitate data collection in accordance with a persisted intent. For example, a membership tracking mechanism can detect a new machine joining computer system cluster 101. A persistence mechanism can then persist a data collection intent to the joining computer system. The joining computer system can then collect data in accordance with the persisted intent.

In one aspect, different mechanisms of health service 103 are implemented in different layers. For example, a persistence mechanism can be implemented in a shared data layer of health service 103, a data collection mechanism can be implemented in a point to point messaging layer of health service 103, and a membership tracking mechanism can be implemented in a membership layer of health service 103. As depicted, health service 103 spans the machines of computer system cluster 101. As such, the layers of health service 103 can facilitate communication between components at different machines in computer system cluster 101.

As depicted, machine 121 includes data manager(s) 122, persistence manager 123, plug-ins 124, APIs 125 (one or more of which may be operating system APIs), and machine resources 126. Persistence manager 123 is configured to receive a data collection intent and persist the data collection intent at machine 121. The data collection intent can be received from another computing device (e.g., server 102) or from another persistence manager in computer system cluster 101. When appropriate, persistence manager 123 can send a data collection intent to plug-ins 124 instructing plug-ins 124 to collect data in accordance with the data collection intent.

Depending on data type and/or a collection strategy, data collection can occur from time to time, at specified intervals, on an ongoing basis, for number of collection instances, until explicitly canceled, etc. Persistence manager 123 is also in communication with other persistence managers at other machines in computer system cluster 101 (e.g., through a shared data layer). Persistence manager 123 can communicate with other persistence managers to persist a data collection intent to other persistence managers, such as, for example, when a data collection intent changes or when a new machine joins computer system cluster 101.

Data manager(s) 122 are configured to collect data from a number of different plug-ins and in a number of different data types. Data manager(s) 122 are also configured to aggregate data collected from a number of different plug-ins and in a number of different data types (e.g., in accordance with an aggregation strategy) into a health report. The health report can indicate the health of defined computing functionality being provided by computer system cluster 101 to an external system. Data manager(s) 122 can return the health report to another computing device.

In one aspect, data manager(s) 122 include a single data manager configured to collect and aggregate data from a number of different plug-ins and in a number of different data types. In another aspect, data manager(s) 122 includes a plurality of data managers. One or more data managers can be configured to collect data from plug-ins corresponding to a specified data type. For example, one data manager 122 can be configured to collect performance counters, another data manager 122 can be configured to collect event data, a further data manager can be configured to collect instrumentation data, etc. One or more other data managers 122 are configured to aggregate (e.g., sum, average, etc.) different types of collected data, for example, in accordance with an aggregation strategy.

Plug-ins 124 includes one or more plug-ins, including plug-ins 124A and 124B. Application Program Interfaces (APIs) 125 includes one or more APIs including APIs 125A and 125B. Machine resources 126 can include hardware, firmware, circuitry, and software resources of machine 121.

Each of plug-ins 124 is tailored to collect a specified data type through interoperation with a corresponding Application Programming Interface (API) 125 for the specified data type. For example, API 125A can be an API to access performance counters from machine resources 126. Plug-in 124A can be tailored to collect performance counters through interoperation with API 125A. Similarly, API 125B can be an API to access event data from machine resources 126. Plug-in 124B can be tailored to collect event data through interoperation with API 125B. Plug-ins 124 can return collected data back to data manger(s) 122.

As depicted, machine 131 includes persistence manager 133, plug-ins 134, APIs 135 (one or more of which may be operating system APIs), and machine resources 136. Persistence manager 133 is configured to receive a data collection intent and persist the data collection intent at machine 131. Persistence manager 133 can receive a data collection intent from another persistence manager in computer system cluster 101, such as, for example, persistence manager 123. When appropriate, persistence manager 133 can send a data collection intent to plug-ins 134 instructing plug-ins 134 to collect data in accordance with the data collection intent.

Depending on data type and/or a data collection strategy, data collection can occur from time to time, at specified intervals, on an ongoing basis, for number of collection instances, until explicitly canceled, etc. Persistence manager 133 is also in communication with other persistence managers at other machines in computer system cluster 101 (e.g., through a shared data layer). Persistence manager 133 can communicate with other persistence managers to persist a data collection intent to other persistence managers, such as, for example, when a data collection intent changes or when a new machine joins computer system cluster 101.

Plug-ins 134 includes one or more plug-ins, including plug-ins 134A and 134B. Application Program Interfaces (APIs) 135 includes one or more APIs including APIs 135A and 135B. Machine resources 136 can include hardware, firmware, circuitry, and software resources of machine 131.

Each of plug-ins 134 is tailored to collect a specified data type through interoperation with a corresponding Application Programming Interface (API) 135 for the specified data type. For example, API 135A can be an API to access performance counters from machine resources 136. Plug-in 134A can be tailored to collect performance counters through interoperation with API 135A. Similarly, API 135B can be an API to access event data from machine resources 136. Plug-in 134B can be tailored to collect event data through interoperation with API 135B. Plug-ins 134 can return collected data back to data manger(s) 122.

As depicted, machine 141 includes persistence manager 143, plug-ins 144, APIs 145 (one or more of which may be operating system APIs), and machine resources 146. Persistence manager 143 is configured to receive a data collection intent and persist the data collection intent at machine 141. Persistence manager 143 can receive a data collection intent from another persistence manager in computer system cluster 101, such as, for example, persistence manager 143. When appropriate, persistence manager 143 can send a data collection intent to plug-ins 144 instructing plug-ins 144 to collect data in accordance with the data collection intent.

Depending on data type and/or a collection strategy, data collection can occur from time to time, at specified intervals, on an ongoing basis, for number of collection instances, until explicitly canceled, etc. Persistence manager 143 is also in communication with other persistence managers at other machines in computer system cluster 101 (e.g., through a shared data layer). Persistence manager 143 can communicate with other persistence managers to persist a data collection intent to other persistence managers, such as, for example, when a data collection intent changes or when a new machine joins computer system cluster 101.

Plug-ins 144 includes one or more plug-ins, including plug-ins 144A and 144B. Application Program Interfaces (APIs) 145 includes one or more APIs including APIs 145A and 145B. Machine resources 146 can include hardware, firmware, circuitry, and software resources of machine 141.

Each of plug-ins 144 is tailored to collect a specified data type through interoperation with a corresponding Application Programming Interface (API) 145 for the specified data type. For example, API 145A can be an API to access performance counters from machine resources 146. Plug-in 144A can be tailored to collect performance counters through interoperation with API 145A. Similarly, API 145B can be an API to access event data from machine resources 146. Plug-in 144B can be tailored to collect event data through interoperation with API 145B. Plug-ins 144 can return collected data back to data manger(s) 122.

Computer system cluster 101 can be configured in an active, passive, passive arrangement. Machine 121 is active and machines 131 and 141 are passive. As depicted, machines 131 and 141 include data manager(s) 132 and data manager(s) 142. Data manager(s) 132 and 142 can include the same functionality as data manager(s) 122. However, data manager(s) 132 and 142 are inactive. If machine 121 fails, either machine 131 or machine 141 can become active. When a passive machine because the active machine, the data manager(s) at the active machine can be activated. For example, if machine 131 becomes active, data manager(s) 132 can be activated. Likewise, if machine 141 because active, data manager(s) 142 can be active. Another machine can also be added to computer system cluster 101 as a passive machine.

Aspects of the invention can also be implemented using other computer system cluster arrangements including and active, active, active arrangement. In an active, active, active arrangement data manager(s) at different machines are active and can coordinate collection and aggregation of data.

APIs at different machines in computer system cluster 101 can be configured to collect the same type of data. For example, APIs 125A, 135A, and 145A can be configured to collect the same type of data, such as, for example, performance counters. Similarly, APIs 125B, 135B, and 145B can be configured to collect the same type of data (but a different type of data than APIs 125A, 135A, and 145A), such as, for example, event data. Other APIs at each of machines 121, 131, and 141 can be configured to collect the same type of data (but a different type of data than APIs 125A, 135A, and 145A and APIs 125B, 135B, and 145B), such as, for example, instrumentation data.

In one aspect, a data collection intent indicates that operational data is to be collected and aggregated to assess the health of defined computing functionality provided to an external system. For example, portions of machine resources 126, 136, and 146 can be allocated to provide a storage volume for the external system. A data collection intent can indicate that operational data is to be collected to assess the health of the storage volume. Similarly, portions of machine resources 126, 136, and 146 can be allocated to provide a virtual machine (VM) host for the external system. A data collection intent can indicate that operational data is to be collected to assess the health of the VM host. Other combinations of machine resources 126, 136, and 146, including storage, compute, and network resources can be allocated to provide other defined computing functionality to the external system. A data collection intent can indicate that operational data is to be collected to assess the health of the resources providing the defined computing functionality.

Machines in computer system cluster 101, including machines 121, 131, and 141, can use utilize the same operating system. Health service 103 can be integrated into the operating system. When the operating system is changed or updated, corresponding changes or updates can be made to health service 103 (e.g., plug-ins) for consistency and/or compatibility with other aspects of the operating system (e.g., APIs). As such, there is little, if any, chance of lower level aspects of data collection (e.g., APIs) drifting and becoming inconsistent and/or incompatible with higher level aspects of data collection and aggregation (e.g., plug-ins and data managers).

This provides an advantage over imperative data collection, where collection components external to a computer system cluster are responsible for both data collection and data aggregation. Using imperative data collection, each time the operating system changes, corresponding changes are required for the external collection components to maintain compatibility. As such, the entity responsible for the external collection components is required to have extensive knowledge of the operating system. Requiring knowledge of the operating system places a significant burden on the entity responsible for the external collection components.

Further, operating systems often included propriety code that is not available to the public. Thus, an entity responsible for external collection components may have no way to determine changes required for compatibility with the operating system (even if there is a desire to do so).

Aspects of the invention also abstract cluster type for a computer system cluster from an entity desiring to collect and aggregate operational data from the computer system cluster. Thus, entities are relieved from having to have knowledge of cluster configuration to collect and aggregate operational data from a computer system cluster.

Figure 2:
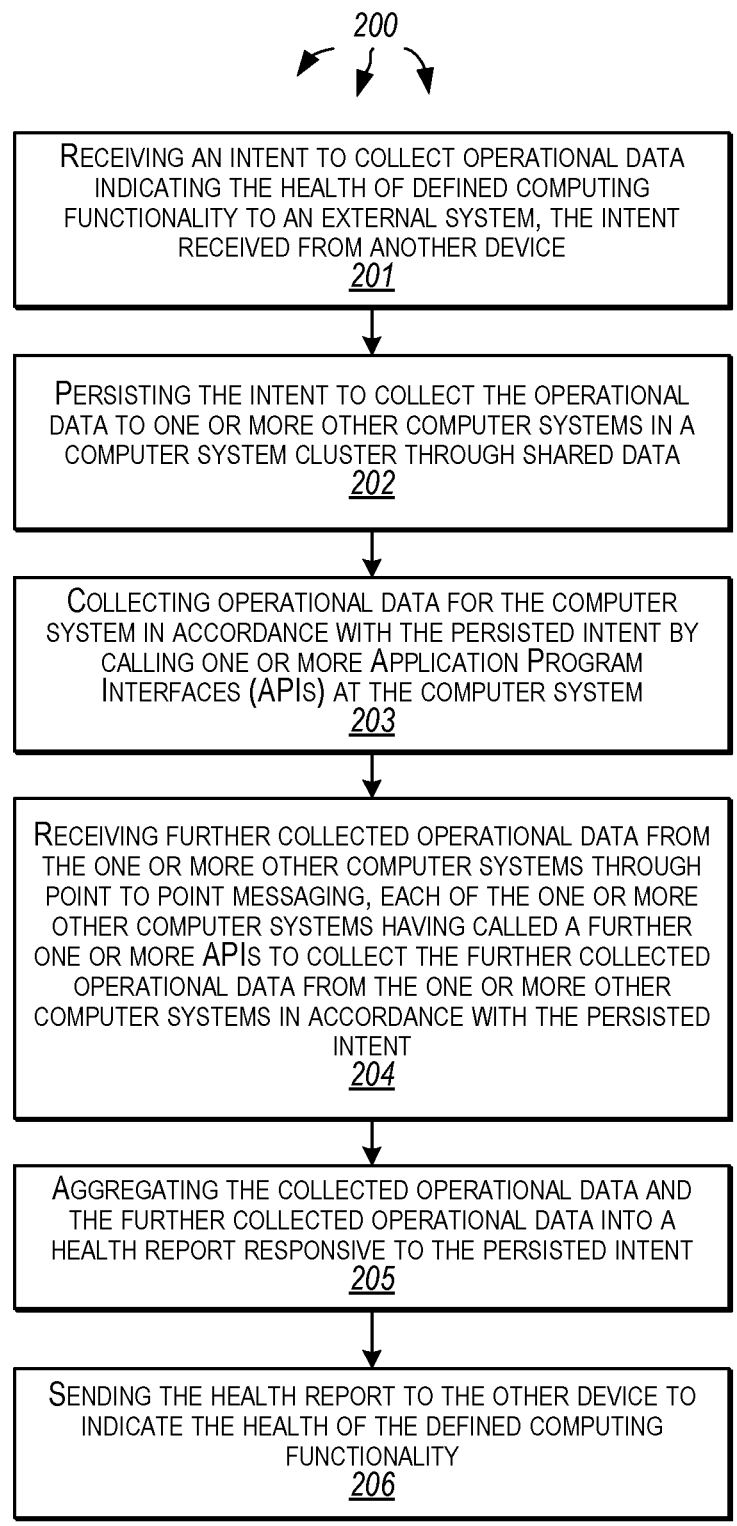
FIG. 2 illustrates a flow chart of an example method for collecting and aggregating data for computing functionality provided by a computer system cluster.

FIG. 2 illustrates a flow chart of an example method 200 for collecting and aggregating data for computing functionality provided by a computer system cluster. Method 200 will be described with respect to the components and data of computer architecture 100.

Method 200 includes receiving an intent to collect operational data indicating the health of defined computing functionality to an external system, the intent received from another device (201). For example, persistence manager 123 can receive intent 104 from server 102. Intent 102 can indicate that operational data is to be collected to determine the health of functionality 191.

Method 200 includes persisting the intent to collect the operational data to one or more other computer systems in a computer system cluster through shared data (202). For example, persistence manager 123 can persistent intent 104 at machine 121 and to persistence managers 133 and 134 (e.g., through a shared data layer of health service 103).

Method 200 includes collecting operational data for the computer system in accordance with the persisted intent by calling one or more Application Program Interfaces (APIs) at the computer system (203). For example, persistence manager 123 can send intent 104 to plug-ins 124 in accordance with a collection strategy. Intent 104 can indicate that one or more different types of data is to be collected. Plug-ins 124 corresponding to each of the one or more different data types can interoperate with corresponding APIs to collect the operational data.

For example, plug-in 124A can interoperate with API 125A. API 125A can send call 161 machine resources 126 to obtain data 162 (e.g., performance counters for machine resources 126). API 125A can return data 162 to plug-in 124A. Since machine 121 is active, plug-in 124A can then send data 162 to data manager(s) 122 (e.g., using a point to point messaging layer of health service 103). Data manager(s) 122 can receive data 162 from Plug-in 124A.

Similarly, plug-in 124B can interoperate with API 125B. API 125B can send call 163 machine resources 126 to obtain data 164 (e.g., operating system event data for machine resources 126). API 125B can return data 164 to plug-in 124B. Since machine 121 is active, plug-in 124B can then send data 164 to data manager(s) 122 (e.g., using the point to point messaging layer of health service 103). Data manager(s) 122 can receive data 164 from Plug-in 124B.

Other plug-ins 124 for other data types may or may not be used based on intent 104.

Method 200 includes receiving further collected operational data from the one or more other computer systems through point to point messaging, each of the one or more other computer systems having called a further one or more APIs to collect the further collected operational data from the one or more other computer systems in accordance with the persisted intent (204). For example, data manager(s) 122 can receive data 172 from plug-in 134A, can receive data 174 from plug-in 134B, receive data 182 from plug-in 144A, and can receive data 174 from plug-in 144B (e.g., using the point to point messaging layer of health service 103).

Persistence manager 133 can send intent 104 to plug-ins 134 in accordance with the collection strategy. Intent 104 can indicate that the one or more different types of data is to be collected. Plug-ins 134 corresponding to each of the one or more different data types can interoperate with corresponding APIs to collect the operational data.

For example, plug-in 134A can interoperate with API 135A. API 135A can send call 171 machine resources 136 to obtain data 172 (e.g., performance counters for machine resources 136). API 135A can return data 172 to plug-in 124A. Since machine 121 is active, plug-in 124A can then send data 172 to data manager(s) 122 (e.g., using the point to point messaging layer of health service 103). Data manager(s) 122 can receive data 172 from plug-in 134A.

Similarly, plug-in 134B can interoperate with API 135B. API 135B can send call 173 machine resources 136 to obtain data 174 (e.g., operating system event data for machine resources 136). API 135B can return data 174 to plug-in 134B. Since machine 121 is active, plug-in 134B can then send data 174 to data manager(s) 122 (e.g., using the point to point messaging layer of health service 103). Data manager(s) 122 can receive data 174 from Plug-in 124B.

Other plug-ins 134 for other data types may or may not be used based on intent 104.

Persistence manager 143 can send intent 104 to plug-ins 144 in accordance with a collection strategy. Intent 104 can indicate that the one or more different types of data is to be collected. Plug-ins 144 corresponding to each of the one or more different data types can interoperate with corresponding APIs to collect the operational data.

For example, plug-in 144A can interoperate with API 145A. API 145A can send call 181 machine resources 146 to obtain data 182 (e.g., performance counters for machine resources 146). API 145A can return data 182 to plug-in 144A. Since machine 121 is active, plug-in 144A can then send data 182 to data manager(s) 122 (e.g., using the point to point messaging layer of health service 103). Data manager(s) 122 can receive data 182 from plug-in 144A.

Similarly, plug-in 144B can interoperate with API 145B. API 145B can send call 183 machine resources 146 to obtain data 184 (e.g., operating system event data for machine resources 146). API 145B can return data 184 to plug-in 144B. Since machine 121 is active, plug-in 144B can then send data 184 to data manager(s) 122 (e.g., using the point to point messaging layer of health service 103). Data manager(s) 122 can receive data 144 from Plug-in 124B.

Other plug-ins 144 for other data types may or may not be used based on intent 104.

Method 200 includes aggregating the collected operational data and the further collected operational data into a health report responsive to the persisted intent (205). For example, data manager(s) 122 can aggregate data 162, 164, 172, 174, 182, and 184 into health report 106. Health report 106 indicates the health of functionality 191 and is responsive to intent 104. Aggregating data can include adding, averaging, etc. as well as performing other operations on collected data in accordance with an aggregation strategy.

Method 200 includes sending the health report to the other device to indicate the health of the defined computing functionality (206). For example, data manager(s) 122 can send health report 106 to server 102 to indicate the health of functionality 191. From health report 106, a user of server 102 is made aware of the health of functionality 191.

Figure 3:
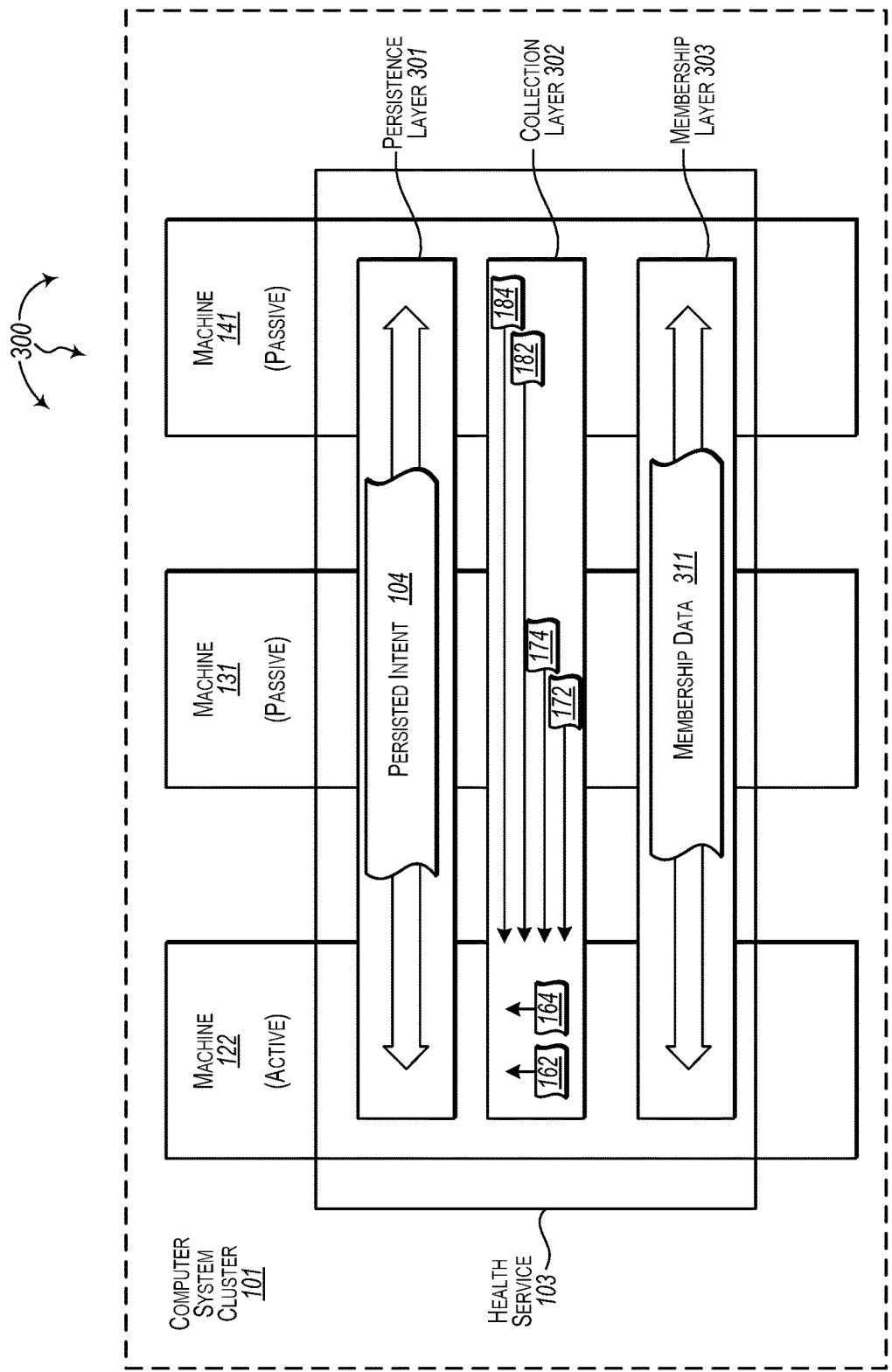
FIG. 3 illustrates an example architecture of layers of a service.

FIG. 3 illustrates an example architecture 300 of layers of a health service layers. As depicted, health service 103 includes persistence layer 301, collection layer 302, and membership layer 303. Persistence layer 104 can be a shared data layer used to share intent 104 among machines 121, 131, and 141. Collection layer 302 can be a point to point messaging layer used to return collected data 162, 164, 172, 174, 182, and 184 to data manager(s) 122. Membership layer 303 can be used to share membership data 311 among machines 121, 131, and 141. Membership data 311 can indicate machines that are members of computer system cluster 101.

Figure 4A:
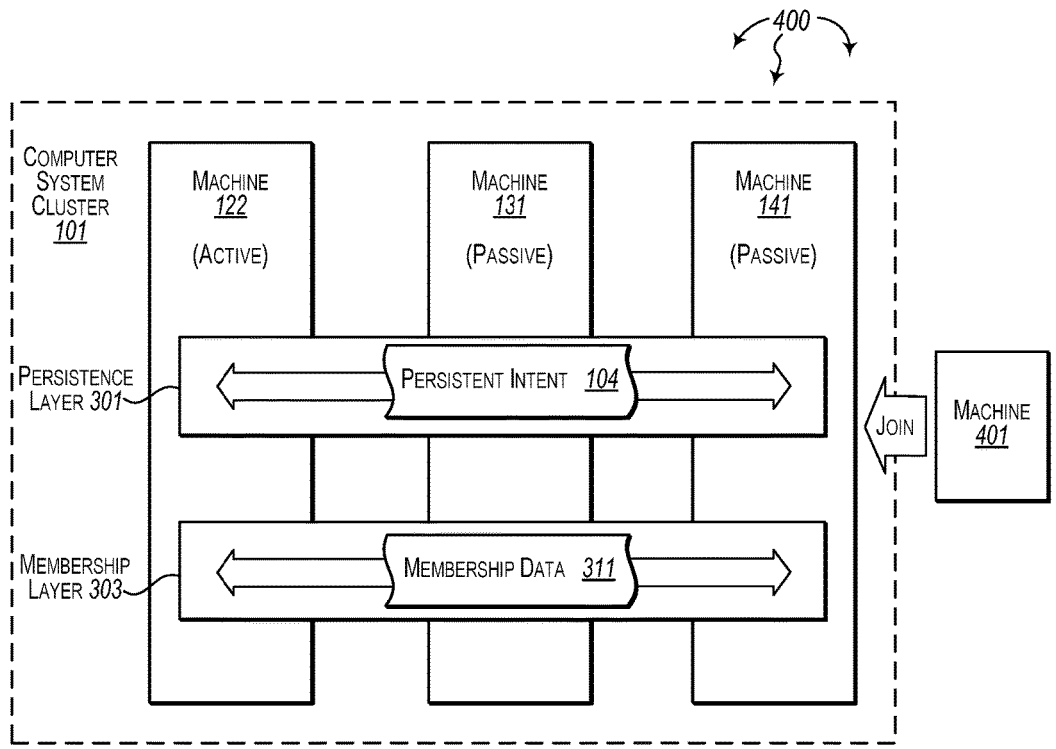
FIGS. 4A and 4B illustrate an example architecture for persisting intent to a new machine of a computer system cluster.
Figure 4B:
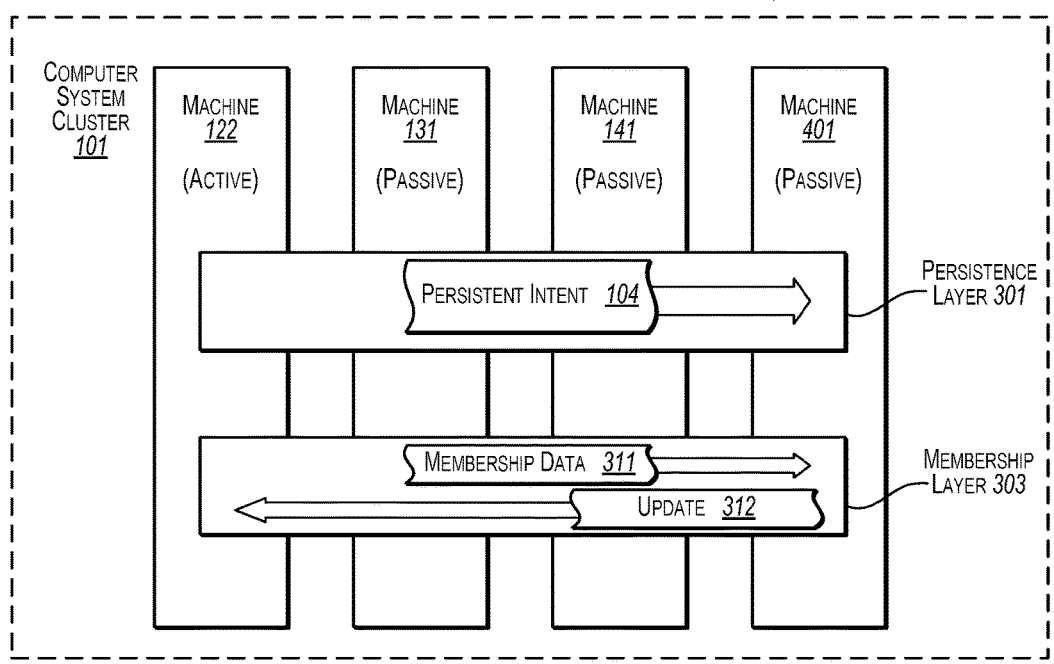

Changes in the membership of a cluster can cause intent 104 to be persisted to a new machine. FIGS. 4A and 4B illustrate an example architecture 400 for persisting intent to a new machine of a computer system cluster. As depicted in FIG. 4A, machine 401 joins as a member computer system cluster 101. As part of the join process, health service 103 can be adjusted to span machine 401.

Turning to FIG. 4B, upon spanning machine 401, membership layer 303 detects the addition of machine 401 to computer system cluster 101. Existing membership data 311 can be sent to machine 401 via membership layer 303. Membership update 312 can be sent to machines 121, 131, and 141 via membership layer 303 to indicate the addition of machine 401. In response to membership update 312, one or more of persistence managers 123, 133, and 143 can share intent 104 with machine 401 via persistence layer 301. Machine 401 can send intent 104 to plug-ins to collect data and return the data to data manager(s) 122 via collection layer 302.

A user or other system can change what operational data is collected for a health report by submitting a different intent to computer system cluster 101. A user or other system can scope intent to be as narrow or broad as desired. A user or other system can select an intent based on knowledge of monitoring a particular domain.

Figure 5A:
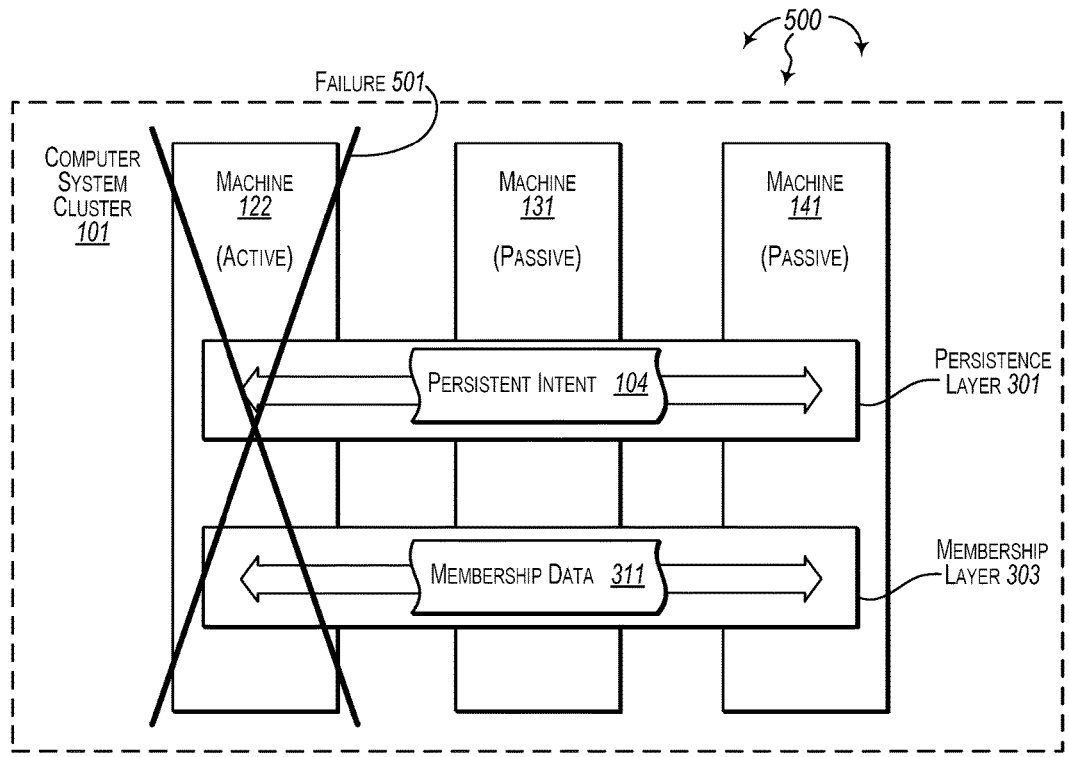
FIGS. 5A and 5B illustrates an example architecture for inferring that an intent is to be deleted.
Figure 5B:
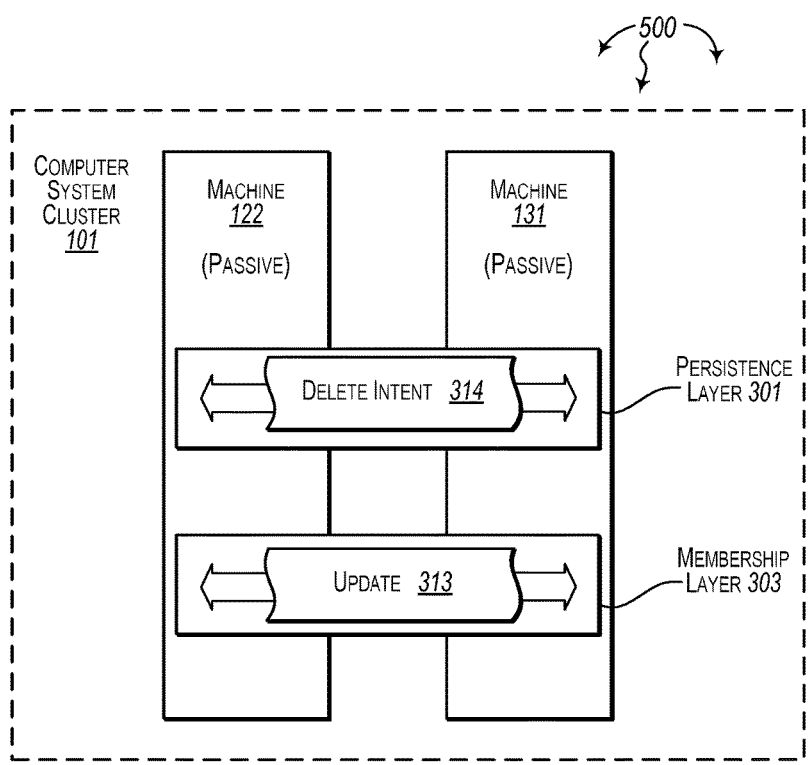

In some aspects, health service 103 can also infer changes to a collection intent. FIGS. 5A and 5B illustrates an example architecture 500 for inferring that a collection intent is to be deleted. As depicted in FIG. 5A, machine 121 suffers failure 501. Failure 501 can cause machine 121 to lose membership in computer system cluster 101.

Turning to FIG. 5B, membership update 313 can be sent to machines 131 and 141 via membership layer 303 to indicate removal of machine 121 from computer system cluster. Since machine 121 was active, machines 131 and 141 have uncertainty as to the continued collection of operational data in accordance with intent 104. So as to not collect operational data unnecessarily, persistence layer 301 infers that data collection in accordance with intent 104 is to stop. Persistence layer 301 shares delete intent 314 with machines 131 and 114 via persistence layer 301. Delete intent 314 indicates to machines 131 and 141 that data collection in accordance with intent 104 is canceled. If and when failover occurs and a new machine becomes active, the new active machine can send out a new collection intent.

Figure 6:
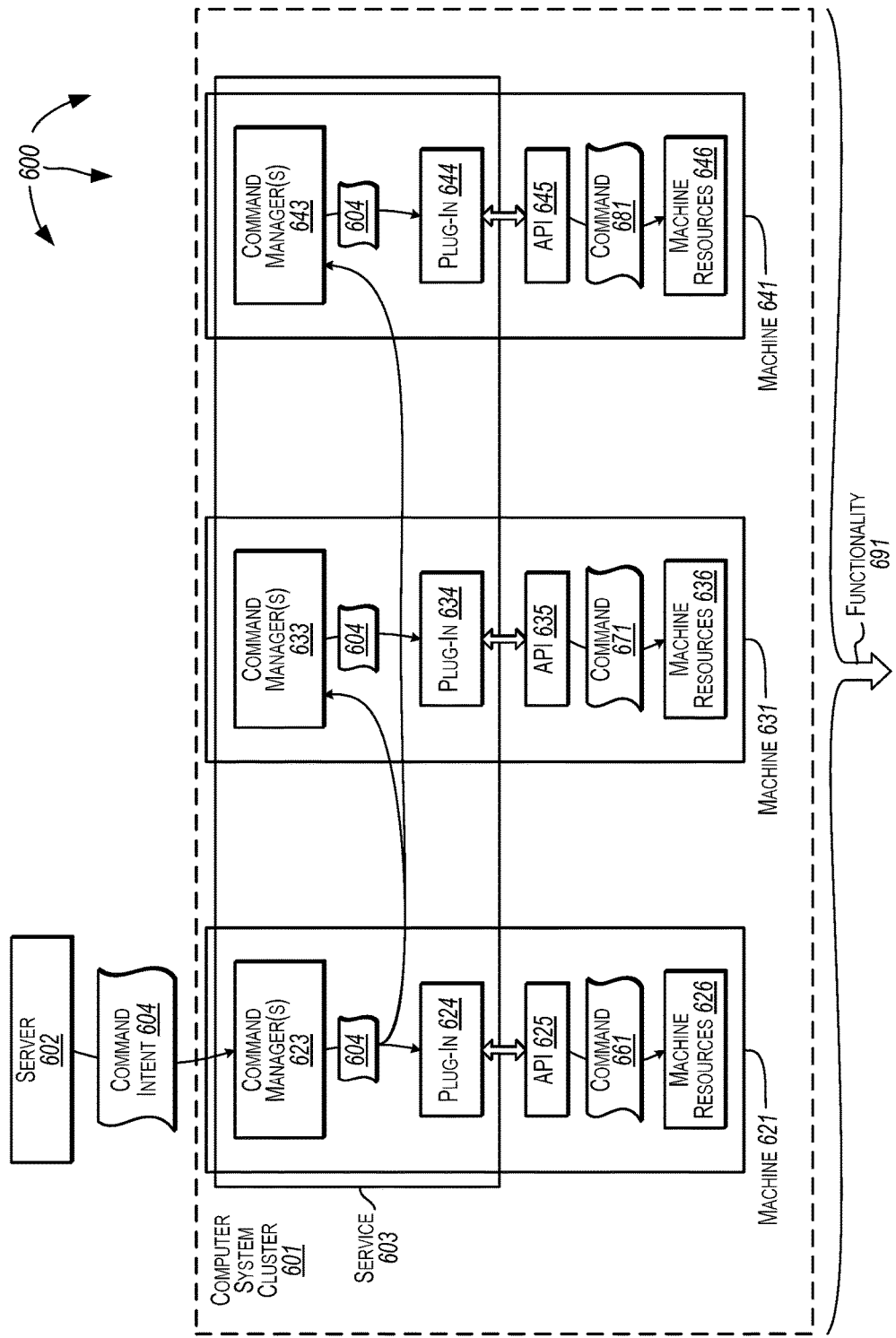
FIG. 6 illustrates an example computer architecture that facilitates implementing a command to computing functionality provided by a computer system cluster.

Aspects of the invention can also be used to send commands to computing functionality provided by a computer system cluster. FIG. 6 illustrates an example computer architecture 600 that facilitates implementing a command to computing functionality 691 provided by computer system cluster 601.

Referring to FIG. 6, computer architecture 600 includes computer system cluster 601, server 602, and service 603. Computer system cluster 601 further includes machines 621, 631, and 641 (e.g., computer systems in a data center). Computer system cluster 601, server 602, service 603, and machines 621, 631, and 641 can be connected to (or be part of) a network, such as, for example, a Local Area Network ("LAN"), a Wide Area Network ("WAN"), and even the Internet. Accordingly, Computer system cluster 601, server 602, health service 603, and machines 621, 631, and 641 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

In general, components of computer system cluster 601 can be allocated to provide functionality 691, such as, for example, a storage volume, virtual machine (VM) hosting, etc., to an external system.

As depicted, service 603 spans the machines of computer system cluster 601, includes machines 621, 631, and 641. Health service 603 provides command persistence mechanism. The command persistent mechanism can persist a command intent across machines of computer system cluster 601, including machines 621, 631, and 641. In one aspect, different mechanisms of service 603 are implemented in different layers. For example, a persistence mechanism can be implemented in a shared data layer of service 603. As such, the layers of service 603 can facilitate communication between components at different machines in computer system cluster 101.

As depicted, machine 621 includes command manager 623, plug-in 624, API 625 (which may be an operating system API), and machine resources 626. Command manager 623 is configured to receive a command intent and persist the command intent at machine 621. The command intent can be received from another computing device (e.g., server 102) or from another command manager in computer system cluster 601. When appropriate, command manager 623 can send a command intent to plug-in 624 instructing plug-in 624 to implement a command in accordance with the command intent.

Depending on command type and a command implementation strategy, a command intent can indicate that a command is to be implemented from time to time, at specified intervals, on an ongoing basis, for number of collection instances, until explicitly canceled, etc. Command manager 623 is also in communication with other command managers at other machines in computer system cluster 601 (e.g., through a shared data layer). Command manager 623 can communicate with other command managers to persist a command intent to other command managers, such as, for example, when a command intent changes or when a new machine joins computer system cluster 601.

Machine resources 626 can include hardware, firmware, circuitry, and software resources of machine 621.

Plug-in 624 is tailored to send a specified command through interoperation with Application Programming Interface (API) 625. For example, API 625 can be an API to set a value for a particular resource in machine resources 626. Plug-in 624 can be tailored to send a command for setting a value for the particular resource through interoperation with API 125. Other Plug-ins and corresponding APIs can interoperation to implement other commands on machines resources 626 in accordance with a command intent.

As depicted, machine 631 includes command manager 633, plug-in 634, API 635 (which may be an operating system API), and machine resources 636. Command manager 633 is configured to receive a command intent and persist command intent at machine 631. Command manager 633 can receive a command intent from another command manager in computer system cluster 601, such as, for example, command manager 623. When appropriate, command manager 633 can send a command intent to plug-in 634 instructing plug-in 634 to implement a command in accordance with the command intent.

Depending on command type and a command implementation strategy, a command intent can indicate that a command is to be implemented from time to time, at specified intervals, on an ongoing basis, for number of collection instances, until explicitly canceled, etc. Command manager 633 is also in communication with other command managers at other machines in computer system cluster 601 (e.g., through a shared data layer). Command manager 633 can communicate with other command managers to persist a command intent to other command managers, such as, for example, when a command intent changes or when a new machine joins computer system cluster 601.

Machine resources 636 can include hardware, firmware, circuitry, and software resources of machine 631.

Plug-in 634 is tailored to send a specified command through interoperation with Application Programming Interface (API) 635. For example, API 635 can be an API to set a value for a particular resource in machine resources 636. Plug-in 634 can be tailored to send a command for setting a value for the particular resource through interoperation with API 635. Other Plug-ins and corresponding APIs can interoperation to implement other commands on machines resources 636 in accordance with a command intent.

As depicted, machine 641 includes command manager 643, plug-in 644, API 645 (which may be an operating system API), and machine resources 646. Command manager 643 is configured to receive a command intent and persist command intent at machine 641. Command manager 643 can receive a command intent from another command manager in computer system cluster 601, such as, for example, command manager 643. When appropriate, command manager 643 can send a command intent to plug-in 644 instructing plug-in 644 to implement a command in accordance with the command intent.

Depending on command type and a command implementation strategy, a command intent can indicate that a command is to be implemented from time to time, at specified intervals, on an ongoing basis, for number of collection instances, until explicitly canceled, etc. Command manager 643 is also in communication with other command managers at other machines in computer system cluster 601 (e.g., through a shared data layer). Command manager 643 can communicate with other command managers to persist a command intent to other command managers, such as, for example, when a command intent changes or when a new machine joins computer system cluster 601.

Machine resources 646 can include hardware, firmware, circuitry, and software resources of machine 641.

Plug-in 644 is tailored to send a specified command through interoperation with Application Programming Interface (API) 645. For example, API 645 can be an API to set a value for a particular resource in machine resources 646. Plug-in 644 can be tailored to send a command for setting a value for the particular resource through interoperation with API 645. Other Plug-ins and corresponding APIs can interoperation to implement other commands on machines resources 646 in accordance with a command intent.

APIs at different machines in computer system cluster 601 can be configured to implement the same type of command. For example, APIs 625, 635, and 645 can be configured to implement the same type of command, such as, for example, to set a value. Other APIs at each of machines 621, 631, and 641 can be configured to implement the same type of command (but a different type of command than APIs 625, 635, and 645), such for, example, to allocate or deallocate memory.

In one aspect, a command intent indicates that a command is to be implemented on defined computing functionality provided to an external system. For example, portions of machine resources 626, 636, and 646 can be allocated to provide a storage volume for the external system. A command intent can indicate that the size of the storage volume is to be increased or decreased. Similarly, portions of machine resources 626, 636, and 646 can be allocated to provide a virtual machine (VM) host for the external system. A command intent can indicate that memory for hosted VMs is to be increased or decreased. Other combinations of machine resources 626, 636, and 646, including storage, compute, and network resources can be allocated to provide other defined computing functionality to the external system. A command intent can indicate that a command is to be implemented against the resources providing the defined computing functionality.

Machines in computer system cluster 601, including machines 621, 631, and 641, can use utilize the same operating system. Service 103 can be integrated into the operating system. When the operating system is changed or updated, corresponding changes or updates can be made to service 603 (e.g., plug-ins) for consistency and/or compatibility with other aspects of the operating system (e.g., APIs). As such, there is little, if any, chance of lower level aspects of command implementation (e.g., APIs) drifting and becoming inconsistent and/or incompatible with higher level aspects of command implementation (e.g., plug-ins).

This provides an advantage over imperative command implementation, where components external to a computer system cluster are responsible implementing commands Using imperative command implementation, each time the operating system changes, corresponding changes are required for the external components to maintain compatibility. As such, the entity responsible for the external components is required to have extensive knowledge of the operating system. Requiring knowledge of the operating system places a significant burden on the entity responsible for the external components.

Further, operating systems often included propriety code that is not available to the public. Thus, an entity responsible for external components may have no way to determine changes required for compatibility with the operating system (even if there is a desire to do so).

Aspects of the invention also abstract cluster type for a computer system cluster from an entity desiring to implement commands in the computer system cluster. Thus, entities are relieved from having to have knowledge of cluster configuration to implement commands in the computer system cluster.

Figure 7:
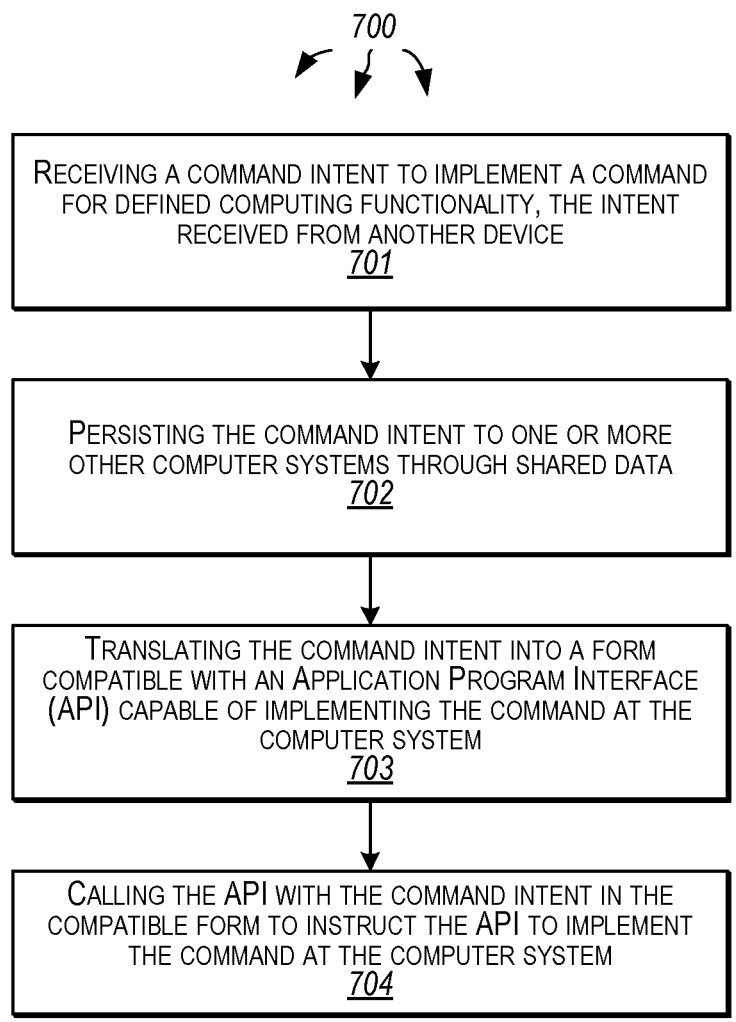
FIG. 7 illustrates a flow chart of an example method for implementing a command to computing functionality provided by a computer system cluster.

FIG. 7 illustrates a flow chart of an example method 700 for implementing a command to computing functionality provided by a computer system cluster. Method 700 will be described with respect to the components and data of computer architecture 600.

Method 700 includes receiving a command intent to implement a command for defined computing functionality, the intent received from another device (701). For example, command manager 623 can command intent 604 from server 602. Command intent 602 can indicate that that a command is to be implemented for functionality 691. Method 700 includes persisting the command intent to one or more other computer systems through shared data (702). For example, command manager 123 can persistent command intent 604 to command managers 633 and 634 (e.g., through a shared data layer of service 603).

Method 700 includes translating the command intent into a form compatible with an Application Program Interface (API) capable of implementing the command at the computer system (703). For example, command manager 623 can send command intent 604 to plug-in 624. Command intent 604 can indicate that a particular type of command is to be implemented. Plug-in 624 can translate command intent into a form compatible with API 625.

Method 700 includes calling the API with the command intent in the compatible form to instruct the API to implement the command at the computer system (704). For example, plug-in 624 can call API 625 with the command intent 604 in the compatible form to instruct API 625 to implement a command representative of command intent 604. In response, API 625 can send command 661 to implement command intent 604 in machine resources 626. In one aspect, API 625 returns a results code indicative whether the command was or was not successful to plug-in 624. When an error occurs, error codes and/or error data can also be returned to plug-in 624. Plug-in 624 can pass results codes, error codes, and error data to command manager 623 (possibly using point to point communication).

Similarly, command manager 633 can send command intent 604 to plug-in 634. Command intent 604 can indicate that a particular type of command is to be implemented. Plug-in 634 can translate command intent into a form compatible with API 635. Plug-in 634 can call API 635 with the command intent 604 in the compatible form to instruct API 635 to implement a command representative of command intent 604. In response, API 635 can send command 671 to implement command intent 604 in machine resources 636. In one aspect, API 635 returns a results code indicative whether the command was or was not successful to plug-in 634. When an error occurs, error codes and/or error data can also be returned to plug-in 634. Plug-in 634 can pass results codes, error codes, and error data to command manager 623, when machine 621 is an active machine (possibly using point to point communication).

Similarly, command manager 643 can send command intent 604 to plug-in 644. Command intent 604 can indicate that a particular type of command is to be implemented. Plug-in 644 can translate command intent into a form compatible with API 645. Plug-in 644 can call API 645 with the command intent 604 in the compatible form to instruct API 645 to implement a command representative of command intent 604. In response, API 645 can send command 681 to implement command intent 604 in machine resources 646. In one aspect, API 645 returns a results code indicative whether the command was or was not successful to plug-in 644. When an error occurs, error codes and/or error data can also be returned to plug-in 644. Plug-in 644 can pass results codes, error codes, and error data to command manager 623, when machine 621 is an active machine (possibly using point to point communication).

When appropriate, command manager 623 can aggregate one or more of: results codes, error codes, and error data into aggregated results. Command manager 623 can send the aggregated results to server 602. From the aggregated results, a user of server 602 is made aware of the success or failure of implementing command intent 604 for functionality 691.

Aspects of data collection and aggregation and command implementation can be implemented within the same architecture. For example, components of computer architecture 100 and computer architecture 600 can be combined to provide intent-based data collection and aggregation and intent-based command implementation for a computer system cluster. In one aspect, a data collection intent and a command intent are both shared via the same persistence layer. For example, persistence layer 301 can be used to persist command intent 604 between machines 621, 631, and 641. In other aspects, separate persistence layers are used to persist data collection intent and command intent.

Similar to FIGS. 4A, and 4B, when a new machine joins a computer system cluster, a command intent can be persisted to the joining machine. Similar to FIGS. 5A and 5B, when an active machines fails, a command intent can be deleted. If and when failover occurs and a new machine becomes active, the new active machine can send out a new command intent.

Figure 8:
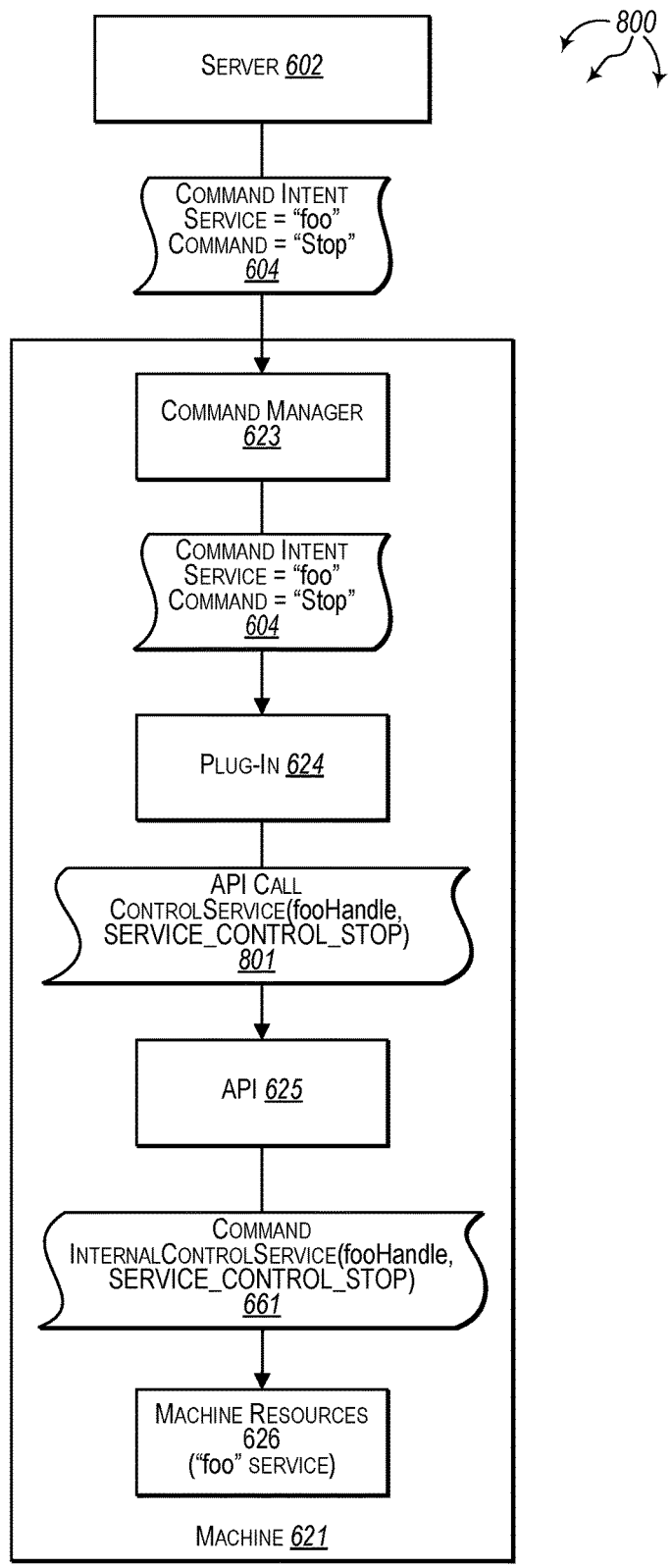
FIG. 8 illustrates an example computer architecture that facilitates implementing a command intent.

FIG. 8 illustrates an example computer architecture 800 that facilitates implementing a command intent. As depicted, service 602 sends command intent 604 to command manager 623. Command intent 604 indicates an intent to implement a "Stop" command for service "foo". Command manager 623 forwards command intent 604 on to plug-in 624 (as well as to command managers 633 and 643). Plug-in 624 receives command intent 604 from command manager 623.

Plug-in 624 transforms command intent 604 into API call 801. API call 801 can be in format compatible with API 625. Plug-in 624 abstracts this format from server 602 and command manager 623. Plug-in 624 passes API call 801 to API 625. API call 801 can include sending parameter "fooHandle" and "SERVICE_CONTROL_STOP" to a ControlService method. API 625 can receive API call 801 from plug-in 624.

API 625 transforms API call 801 into command 661. API 625 can send command 661 to machine resources 626 that are implementing the "foo" service. Command 661 can include sending parameter "fooHandle" and "SERVICE_CONTROL_STOP" to an InternalControlService method. Command 661 stops the service "foo" implemented on machine resources 626. Accordingly, a command is implemented on machine resources 626 without server 602 having to know formats for calling lower level methods and APIs.

Plug-ins 634 and 644 can also access command intent 604 and transform command intent 604 API calls similar to API call 801. The similar API calls can be in formats compatible with APIs 635 and 645 respectively. APIs 635 and 645 can in turn transform the similar API calls into commands 671 and 681 respectively.

Turning briefly back to FIG. 1, transformations similar to the transformations depicted in FIG. 8 can be implemented at persistence managers 123, 133, and 134, plug-ins 124, 134, and 144, and APIs 125, 135, and 145 to implement a data collection intent at machine resources 126, 136, and 146 respectively. Data collected from machine resources 126, 136, and 146 can also be transformed as the data is returned back to data manager(s) 122 for inclusion in health report 106.

FIG. 9 illustrates an example pseudo code sample 900 that can be executed to implement a command intent. Arrow 901 indicates that server 602 executes code representing command intent 604. Arrow 902 indicates that command manager 623 adds command intent 604 to a shared data layer (e.g., of service 603). Arrow 903 indicates that plug-in 624 accesses command intent 604 from the shared data layer. Plug-ins 634 and 644 can similarly access command intent from the shared data layer.

Code sections 904, 905, and 906 are part of API 625. Plug-in 624 can call API 625. API 625 includes a switch statement for starting or stopping a service. Since command intent 604 indicates service "foo" is to be "stopped" (i.e., the values of r.Service and r.Operation), code section 906 is selected to implement command intent 604. Code section 906 is can be executed to send command 661 to machines resources 626 to stop service "foo". Plug-ins 634 and 644 similarly call API 635 and API 645 respectively to implement command intent 604 at machine resources 636 and 646 respectively.

Turning briefly again to FIG. 1, transformations similar to the transformations depicted in FIG. 9 can occur between server 102, persistence manager 123, plug-ins 124, and APIs 225 when collecting operational data for a health report.

In some aspects, a computer system comprises one or more hardware processors, system memory, and is included along with one or more other computer systems in a computer system cluster. Resources from the computer system cluster are allocated to provide defined computing functionality to an external system. The one or more hardware processors are configured to execute the instructions stored in the system memory to formulate a health report for the defined computing functionality.

The one or more hardware processors execute instructions stored in the system memory to receive an intent to collect operational data indicating the health of the defined computing functionality. The one or more hardware processors execute instructions stored in the system memory to persist the intent to collect the operational data to the one or more other computer systems through shared data. The one or more hardware processors execute instructions stored in the system memory to collect the operational data for the computer system in accordance with the persisted intent by calling one or more Application Program Interfaces (APIs) at the computer system.

The one or more hardware processors execute instructions stored in the system memory to aggregate the collected operational data and further collected operational data from the one or more other computer systems into a health report responsive to the persisted intent. The one or more hardware processors execute instructions stored in the system memory to send the health report to another other device to indicate the health of the defined computing functionality.

The one or more hardware processors can also execute instructions stored in the system memory can to receive the further collected operational data from the one or more other computer systems through point to point messaging, each of the one or more other computer systems having called a further one or more APIs to collect the further collected operational data from the one or more other computer systems in accordance with the persisted intent.

Computer implemented methods for performing the executed instructions to formulate a health report for the defined computing functionality are also contemplated. Computer program products for storing the instructions, that when executed by a processor, cause a computer system to formulate a health report for the defined computing functionality are also contemplated.

In other aspects, the one or more hardware processors are configured to execute the instructions stored in the system memory to implement a command for the defined computing functionality. The one or more hardware processors execute instructions stored in the system memory to receive a command intent to implement a command for the defined computing functionality. The one or more hardware processors execute instructions stored in the system memory to persist the command intent to the one or more other computer systems through shared data so that the one or more computer systems can implement a command representing the command intent.

The one or more hardware processors execute instructions stored in the system memory to translate the command intent to a form compatible with an Application Program Interface (API) capable of implementing the command at the computer system. The one or more hardware processors execute instructions stored in the system memory to call the API with the command intent in the compatible form to instruct the API to implement a command representative of the command intent at the computer system. The one or more hardware processors execute instructions stored in the system memory to receive one or more of: a result code, an error code, and error data back from the API indicating whether the representative command was or was not successful.

Computer implemented methods for performing the executed instructions to implement a command for the defined computing functionality are also contemplated. Computer program products for storing the instructions, that when executed by a processor, cause a computer system to implement a command for the defined computing functionality are also contemplated.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A computer system, the computer system comprising:
   one or more hardware processors;
   system memory coupled to the one or more hardware processors, the system memory storing instructions that are executable by the one or more hardware processors; and
   the one or more hardware processors executing the instructions stored in the system memory to:
      receive an intent to collect operational data indicative of the health of resources integrated together to provide defined computing functionality, the intent to collect operational data including a collection strategy for collecting operational data;
      determine membership in a computer system cluster including detecting that another computer system has been added as a member of the computer system cluster;
      persist the intent to collect operational data to members of the computer system cluster including to the other computer system;
      collect operational data for resources at the computer system that are integrated to provide the defined computing functionality and in accordance with the persisted intent;
      receive further collected operational data from the other computer system, the further collected operational data collected for resources at the other computer system that are integrated to provide the defined computing functionality and in accordance with the persisted intent;
      aggregate the collected operational data and the further collected operational data into a health report for the defined computing functionality and responsive to the persisted intent, the collected operational data and the further collection operational data aggregated in accordance with an aggregation strategy; and
      send the health report to another device to indicate the health of the defined computing functionality to the other device.

2. The computer system of claim 1, wherein the one or more hardware processors executing the instructions to receive further collected operational data comprises the one or more hardware processors executing the instructions to receive further collected operational data obtained by the other computer system having called one or more Application Program Interfaces (APIs) to collect the further collected operational data.

3. The computer system of claim 1, wherein the one or more hardware processors executing the instructions to receive an intent to collect operational data comprises the one or more hardware processors configured to execute the instructions to receive an intent to collect one or more of: performance counters, system event metrics, or instrumentation metrics for the integrated resources.

4. The computer system of claim 1, wherein the one or more hardware processors configured to execute the instructions to receive an intent to collect operational data comprises the one or more hardware processors executing the instructions to receive an intent to collect metrics related to one or more of: storage resources, computer resources, or network resources allocated for the defined computing functionality.

5. The computer system of claim 1, wherein the one or more hardware processors executing the instructions to collect operational data comprises the one or more hardware processors executing the instructions to call one or more Application Program Interfaces (APIs) to collect the operational data.

6. The computer system of claim 1, wherein the one or more hardware processors executing the instructions to aggregate the collected operational data and the further operational data into a health report comprises the one or more hardware processors executing the instructions to aggregate performance metrics for the computer system and performance metrics for the other computer system into aggregated performance metrics for the computer system cluster.

7. The computer system of claim 1, wherein the one or more hardware processors executing the instructions to aggregate the collected operational data and the further collected operational data into a health report comprises the one or more hardware processors executing the instructions to average the collected operational data and the further collected operational data into aggregated operational data.

8. The computer system of claim 1, wherein the one or more hardware processors executing the instructions to persist the intent to collect operational data to members of the computer system cluster comprises the one or more hardware processors executing the instructions to persist the intent to collect operational data through shared data.

9. A method for use at a computer system, the method comprising:
receiving an intent to collect operational data indicative of the health of resources integrated together to provide defined computing functionality, the intent to collect operational data including a collection strategy;
determining membership in a computer system cluster including detecting that another computer system has been added as a member of the computer system cluster;
persisting the intent to collect operational data to members of the computer system cluster including to the other computer system;
collecting operational data for resources at the computer system that are integrated to provide the defined computing functionality and in accordance with the persisted intent;
receiving further collected operational data from the other computer system, the further collected operational data collected for resources at the other computer system that are integrated to provide the defined computing functionality and in accordance with the persisted intent;
aggregating the collected operational data and the further collected operational data into a health report for the defined computing functionality and responsive to the persisted intent, the collected operational data and the further collected operational data aggregated in accordance with an aggregation strategy; and
sending the health report to another device to indicate the health of the defined computing functionality to the other device.

10. The method of claim 9, wherein receiving an intent to collect operational data comprises receiving an intent to collect one of: performance counters, system event metrics, and instrumentation metrics for the allocated resources.

11. The method of claim 9, wherein collecting the operational data comprises calling one or more Application Program Interfaces (APIs) at the computer system to collect the operational data.

12. The method of claim 9, wherein aggregating the collected operational data and the further collected operational data into aggregated operational data comprises one of:
(a) averaging the collected operational data and the further collected operational data to calculate aggregated operational data, or
(b) adding the collected operational data and the further collected operational data to calculate aggregated operational data.

13. The method of claim 9, wherein persisting the intent to collect operational data to members of the computer system cluster comprises persisting the intent to collect operational data through shared data.

14. The method of claim 9, wherein receiving an intent to collect operational data comprises receiving an intent to collect metrics related to one or more of: storage resources, computer resources, or network resources allocated for the defined computing functionality.

15. The method of claim 9, wherein receiving further collected operational data comprises receiving further collected operational data obtained by the other computer system having called one or more Application Program Interfaces (APIs) to collect the further collected operational.

16. A computer system, the computer system comprising:
one or more hardware processors;
system memory coupled to the one or more hardware processors, the system memory storing instructions that are executable by the one or more hardware processors; and
the one or more hardware processors executing the instructions stored in the system memory to:
receive a command intent to implement a command across resources integrated together to provide defined functionality, the command intent including a command implementation strategy for implementing the command, the command intent received from another device;
determine membership in a computer system cluster including detecting that another computer system has been added as a member of the computer system cluster;
persist the command intent to members of the computer system cluster including the other computer system to instruct each member of the computer system cluster, including the other computer system, to implement at least part of the command;

translate the command intent into a form compatible with an Application Program Interface (API) at the computer system capable of implementing at least a first part of the command at the computer system; and call the API with the command intent in the compatible form to instruct integrated resources at the computer system to implement the at least another first part of the command at the computer system.

17. The computer system of claim 16, wherein the one or more hardware processors executing the instructions to call the API with the command intent comprises the one or more hardware processors executing the instructions to call an operating system Application Program Interface (API) with the command intent.

18. The computer system of claim 16, further comprising the one or more hardware processors executing the instructions to receive one or more of: a result code, an error code, or error data back from the API indicating the success of the first part of the command.

19. The computer system of claim 16, wherein the one or more hardware processors executing the instructions to persist the command intent to members of the computer system cluster comprises the one or more hardware processors executing the instructions to persist the command intent through shared data.

* * * * *